RAYMOND W. RUMMEL
INVENTOR.

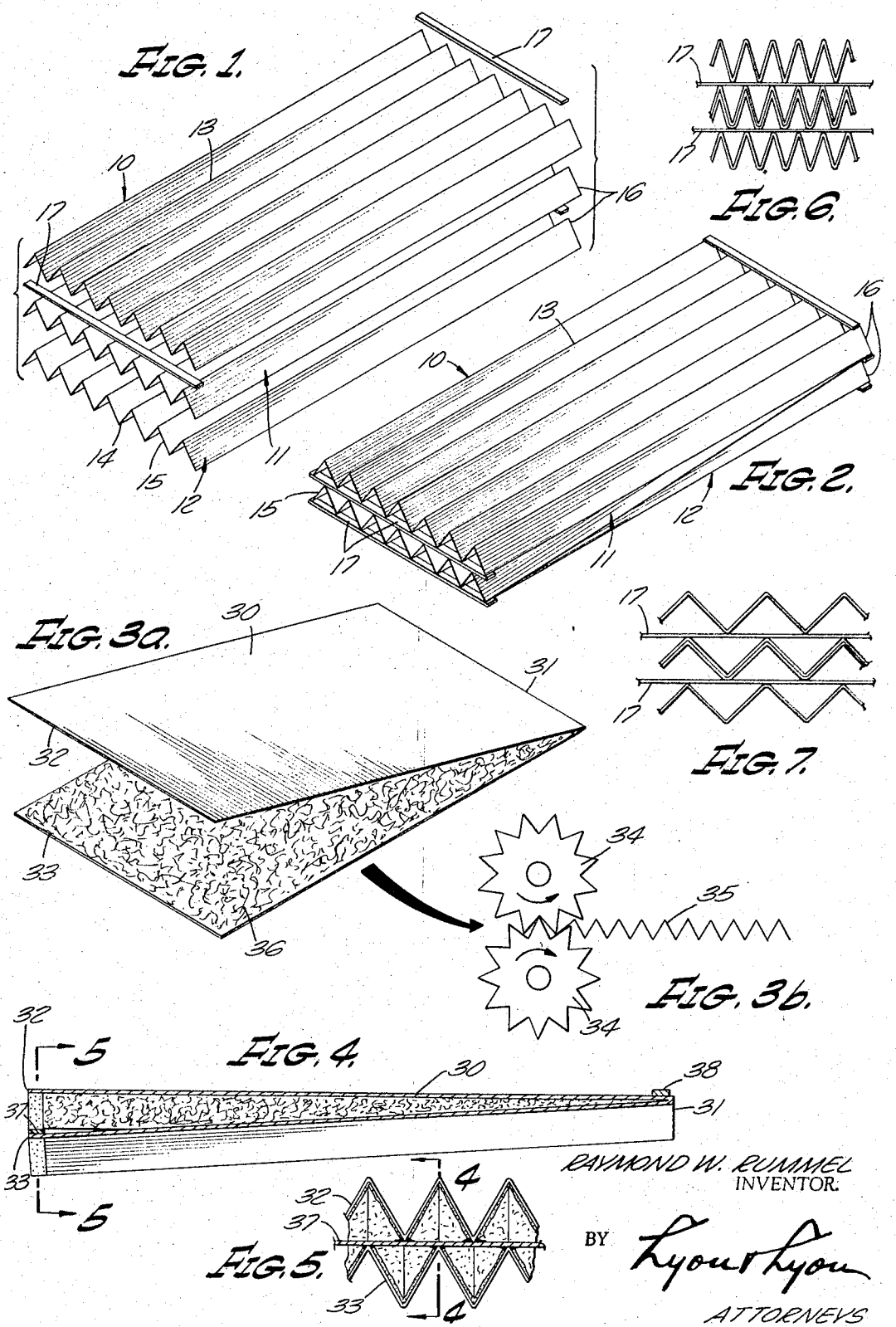

BY Lyon & Lyon
ATTORNEYS

United States Patent Office 3,372,533
Patented Mar. 12, 1968

3,372,533
SELF-SUPPORTING HIGH DENSITY FILTER
Raymond W. Rummel, Long Beach, Calif., assignor to Farr Company, El Segundo, Calif., a corporation of California
Filed July 11, 1966, Ser. No. 564,174
8 Claims. (Cl. 55—499)

ABSTRACT OF THE DISCLOSURE

A high density air filter where the sheet type filter media is spaced and supported upon itself in a housing by employing a multiplicity of longitudinally pleated sheets of media stacked in zig-zag relationship with the opposite longitudinal ends of each sheet in nesting abutment with and sealed to one longitudinal end of each of the adjacent sheets on either side and with the other ends of the adjacent sheets supported in spaced relation by attached spacer strips to form longitudinally converging and diverging passageways between pairs of sheets for the air to flow longitudinally into converging passageways, through one or the other of the sheets, and then out through the diverging passageways.

This invention relates to a flow-through type filter for removing particulate matter from air or other gases and in particular is directed to high density style filters providing a maximum surface area of filtering media for a minimum volume occupied.

In flow-through type filters there are normally various filter medias available to accomplish the desired filtering efficiency for the tolerable pressure drop. The configuration in which the filter media is placed to form the completed filter will depend on the characteristics of the selected media as well as the available and practical space which may be occupied by the filter. It is normally desirable to minimize the overall size of the filter without sacrificing total area of filtering surface and, as a result, various support arrangements have been developed for supporting the filter media in a pleated or deep pocket shape for maximizing the area of filter media relative to the volume occupied. Support arrangements are necessary in order to prevent adjacent pleats or deep pockets from billowing into contact with each other upon passing air therethrough which would reduce the effective filtering area by the amount of mutually contacting area.

Thus in all heretofore conventional high density type filters a superstructure of support elements or separators are provided in contact with the filtering media between pleats and pockets. For example, some filters employ wire baskets framed for receiving deep pockets of filtering media and supporting same. Others employ corrugated or apertured cardboard separators between layers or pleats of filtering media and may even require securing the media to the separators. The provision of such superstructures or separators not only increases the cost of materials and production of the filter but reduces the effective filtering area of the media by the area of contact between the media and the supporting superstructure or separators. In some instances this reduction in effective filtering area is of a significant magnitude.

It is therefore a principal object of this invention to provide a high density type flow-through air filter comprising tiers of pleated filter media sheets of reasonable stiffness stacked in zig-zag relationship with alternate ends of the tiers nesting and sealed together and spacers secured at the pleat ends to separate the nested sealed ends whereby the air will flow in the direction of the pleats between the separated tiers on one end, through the pleated media and out through the separated tiers on the other end. The arrangement is accomplished without the need for separating or supporting elements in contact with the filtering area of the media resulting in a self-supporting configuration.

It is a further object of this invention to provide a novel assembly of pleated filter media stacked in zig-zag nesting relationship with separator strips positioned between alternate ends of the pleats and with such ends and strips sealably joined to structurally integrate the assembly.

It is a further object of this invention to provide a novel apparatus by constructing a high density flow-through type filter by pleating sheets of relatively stiff filter media, stacking such sheets with separator strips across the longitudinal ends of the pleats alternately at one end and then the other between adjacent sheets and sealably joining the longitudinal sheet ends and separator strips. A further object is to provide such an arrangement wherein adjacent sheets are formed in pairs by folding the flat sheet in half before pleating with the fold forming one longitudinal end whereby sealing between sheets along that end is not required and a filter media having one easily-damaged side may be safely pleated by folding that side inwardly.

Other and more detailed objects and advantages of this invention will appear from the following description and the accompanying drawings, wherein:

FIGURE 1 is an exploded perspective view of a portion of the filter assembly of this invention.

FIGURE 2 is a perspective view of the elements of the filter assembly shown in FIGURE 1 illustrated in their assembled condition.

FIGURES 3a and 3b schematically illustrate the folding of a sheet of filtering media with the easily-damaged side inward and pleating such sheet.

FIGURE 4 is a sectional elevation taken on the line 4—4 in FIGURE 5 along the apex of a pleat of the folded and pleated filter media shown in FIGURES 3a and 3b with the free ends of the pleats spread open and separated by a spacer adhered in the position of final assembly.

FIGURE 5 is a fragmentary sectional view taken substantially on the line 5—5 shown in FIGURE 4.

FIGURES 6 and 7 are fragmentary end views of modified arrangements of this invention wherein the pleats are formed with different angles as might be desirable with different filter medias and applications.

Figure 8:
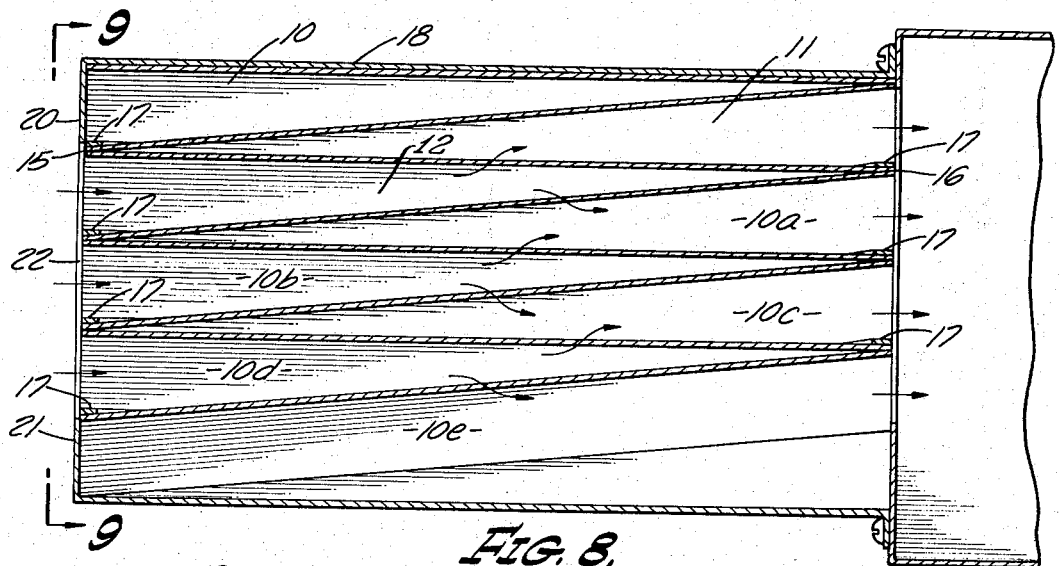

FIGURE 8 is a sectional elevation view of a typical assembly of the pleated filter arrangement of this invention mounted in a housing to confine the air flow therethrough.

Figure 9:
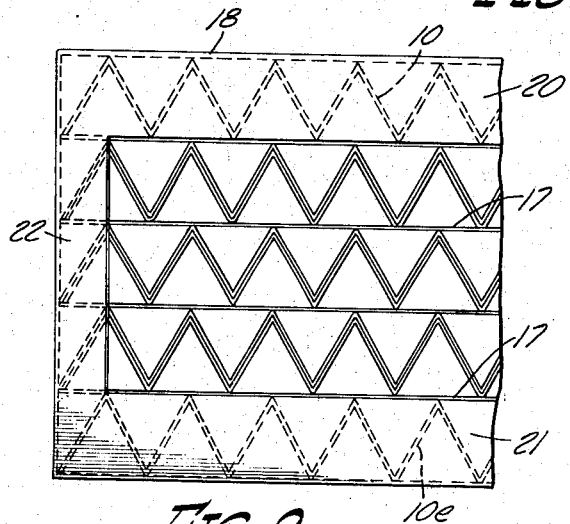

FIGURE 9 is a fragmentary elevation view taken substantially on the line 9—9 of FIGURE 8 illustrating the inlet into the filter assembly.

Figure 10:
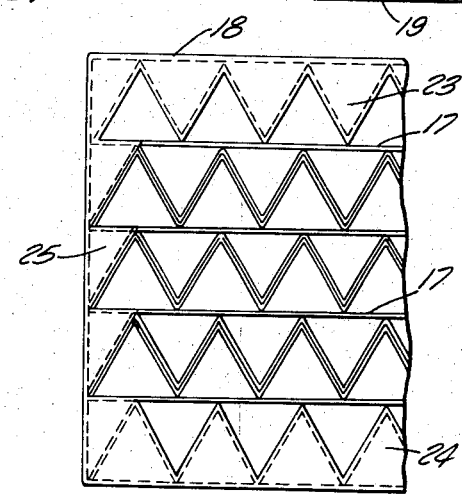

FIGURE 10 is an elevation view similar to FIGURE 9 and illustrating a modified arrangement of the flange surrounding the inlet opening to advantageously expose all of the available filtering media surfaces.

Figure 11:
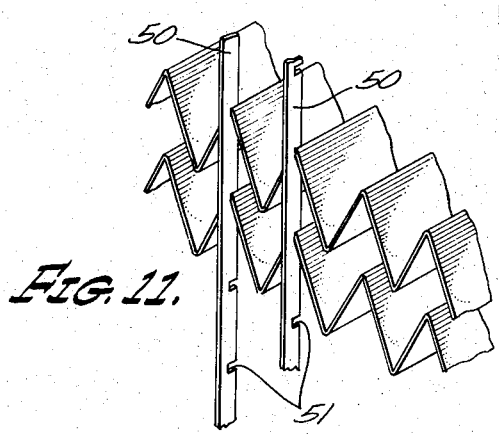

FIGURE 11 is a fragmentary perspective view of a modified arrangement for supporting the pleated filter media sheets in spaced relation.

Figure 12:
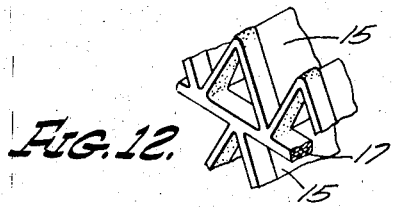

FIGURE 12 is a fragmentary perspective view of the end portion of the filter assembly following emersion into an adhesive sealing material to fully join and seal the pleat ends and separator strips.

Referring now more particularly to FIGURE 1, three substantially identical and separate tiers 10, 11 and 12 of pleated filter media are shown in spaced relationship solely for convenience of illustration. It will readily appear to those skilled in the art that an actual commercial filter assembly made in accordance with this invention will employ a large number of tiers and that such tiers may differ substantially from that shown in FIGURE 1 with respect to the relative proportions of width, length and pleat depth. As illustrated in FIGURE 1 each tier is substantially identical and formed of longitudinally extending pleats which may be formed in any conventional manner compatible with the particular filter media. The upper and lower apexes 13 and 14, respectively, of the pleats are of an appropriate sharpness of crease as to not damage the particular filtering media but are preferably of a sufficient sharpness as to retain the pleated shape. The filter media itself may be of any convenient material having a sufficient stiffness to assume and retain a pleated shape and to have adequate strength in the final assembled filter to avoid collapsing due to air flow therethrough. Of course the requisite strength will depend on the longitudinal length from one longitudinal end 15 to the other longitudinal end 16 of each tier as well as such factors as the rate of air flow to be passed through the air filter assembly. By way of illustration it has been found that various weights of conventional paper filter media possess adequate strength for this arrangement with one-half inch deep pleats and a distance between ends 15 and 16 varying between four to twelve inches although it is to be understood that this is not intended as a limitation but merely as an illustration of what has been found to be practical.

The tiers 10, 11 and 12 are stacked in what may be termed zig-zag nesting relationship as shown in FIGURE 2. In other words, the longitudinal ends 15 of adjacent tiers 11 and 12 are nested in full abutment while the other longitudinal ends 16 of tiers 11 and 12 are separated approximately the depth of the pleats. In turn the longitudinal ends 16 of tiers 10 and 11 are nested in full abutment and the other longitudinal ends 15 thereof are spaced approximately the depth of the pleats. Thus in the assembled condition tiers 10 and 12 are parallel whereas the intermediate tier 11 is inclined from engagement at one end 15 with one tier 12 to the other end 16 with the other tier 10. Additional tiers will be installed successively in the same fashion, that is, a tier above tier 10 would have one end in nesting engagement with the end 15 of tier 10 and the other end spaced from the end 16 of tier 10.

The spacing between the spaced end of the tiers is conveniently maintained by a spacer strip 17 extending laterally of the pleats along the end. Since, as described, the tiers are alternately positioned in nesting relationship and then in spaced relationship at each end, the spacer strips 17 are actually positioned between each pair of adjacent tiers at each end with the strips at one end between different tiers than the strips at the other end. The strips 17 may be of any convenient material having sufficient strength and stiffness to separate and support the tiers. For example, stiff cardboard strips 17 have been found to be satisfactory.

The nesting ends of tiers, such as ends 15 of tiers 11 and 12 and ends 1b of tiers 10 and 11, are joined in sealed relationship to prevent air from passing therebetween at that end. Thus the air passing in the direction from lower left to upper right in FIGURE 2 will pass inward through the space between tiers 10 and 11 which converges toward the sealed end 16 and therefore the air must pass through the material of either tier 10 or tier 11 to escape out through the diverging passageway such as between tiers 11 and 12. Of course a similar diverging passageway will be formed with tier 10 by the next tier positioned thereabove. Each of the spacers 17 is fixed to the apexes 13 and 14 of the two tiers which it separates. Thus the separator strip 17 not only serves to establish the proper separation between the spread ends of the tiers but also to fix permanently the pleat spacing. Moreover this serves to structurally integrate the assemblage. It will readily be seen by those skilled in the art that these successive tiers of pleated material secured to laterally extending strips forms virtually a structural honeycomb thereby producing a completely self-supporting filter assemblage which may be mounted in any appropriate housing or enclosure. The enclosure serves mainly to confine the air flow in the longitudinal direction and to protect the peripheral tiers and pleats.

Referring more particularly to FIGURES 8, 9 and 10, complete filter assemblies including housings are shown. The housing 18 is of the particular size and shape to fit the air intake plenum 19 which is intended to receive the filtered air. The assemblage of pleated filter media tiers and support strips 17 are mounted in the housing 18 in any convenient manner appropriate to the material of the housing and the particular installation. For convenience the tiers illustrated in FIGURES 1 and 2 may be represented in FIGURES 8, 9 and 10 as the uppermost tiers 10, 11 and 12 with the upstream longitudinal ends 15 of tiers 11 and 12 in nesting sealed relationship as are the downstream longitudinal ends 16 of tiers 10 and 11. Continuing successively therebelow there are provided tiers 10a, 10b, 10c, 10d and 10e stacked and mounted in the same zig-zag nesting relationship and including separator strips 17. It is to be noted that since the pleats extend longitudinally in the direction of air flow the outwardly facing pleats of the uppermost and lowermost tiers, here 10 and 10e, must be sealed to the housing at either the intake or outlet end to prevent contaminated air from merely passing longitudinally along such pleat grooves from the intake to the outlet. This may be accomplished by an upper flange 20 and lower flange 21 on the intake of the housing 18 extending inwardly a distance equal to the depth of a tier and in sealed relationship with the ends 15 of tiers 10 and 10e. Similarly a flange 22 may be provided along the lateral sides and sealed with the edges of the tiers to prevent by-pass flow along the side. As an alternative for providing a greater intake area, the flanges 20, 21 and 22 may be comprised of sawtooth shaped tabs 23, 24 and 25, respectively as shown in FIGURE 10 for fitting the pleats and blocking solely the longitudinal by-pass passageways which would otherwise occur around the periphery.

Referring now to FIGURES 3a, 3b, 4 and 5 a sheet of filter media 30 may be folded in half along line 31 to form a sheet of the desired longitudinal length of the pleated tier between line 31 and the free ends 32 and 33 of the sheet. The length of the sheet in the other direction is sufficient to accommodate the pleating and result in the desired lateral width of the tier. The folded sheet is then passed through pleating rollers 34 or pleated in any other convenient fashion to form the resultant double-ply pleated sheet 35. Although it is not essential to this embodiment it is to be noted that the inwardly folded surface 36 of the filter media sheet 30 is protected from the pleating rollers and therefore this surface may be of an easily-damaged material and yet is protected. The free ends 32 and 33 of the pleated sheet 35 are then spread open and a separating strip 37, similar to aforedescribed strip 17, is positioned between the pleated free ends. A filter assemblage is constructed of the pleated sheets 35 with separators 37 installed by stacking the sheets in the same orientation with separator strips 38 at the end 31 between adjacent pleated sheets 35. In a manner similar to the aforedescribed embodiment, the free end 33 of a pleated sheet 35 will be nested and sealed with the free end 32 of the next lower pleated sheet 35 and so on. Of course the nested ends of the pleats at end 31 need not be sealed since the end is formed by a fold. The resultant filter structure employing pleated sheets 35 is substantially identical to the aforedescribed embodiment with each tier 10, 11 or 12 being formed by one-half of the pleated sheet 35 between the folded end 31 and one of the free ends 32 or 33.

As previously mentioned, the pleats may be formed in any desired manner compatible with the particular filter media and in addition the angle between the sides of the pleats may be of any convenient magnitude compatible with the filter requirements and the media. The heretofore described embodiments are illustrated with the preferable pleat angle of 60° between the sides of the pleat, that is, the included angle at the apexes 13 and 14 is 60° whereby the pleats also form an angle of 60° with the particular support strip 17, 37 or 38. However where it is desired to provide even more filter media in the space occupied, the included angle between the sides of the pleat at the apexes 13 and 14 may be reduced, as shown in FIGURE 6, thereby providing a greater number of pleats with a smaller distance between pleats. Conversely where perhaps somewhat less filter media is required and the media itself is of sufficient rigidity, the included angle between the sides of the pleats may be increased, as shown in FIGURE 7. In all other respects the filter assemblage remains the same.

Referring more particularly to FIGURE 12, the longitudinal end of an assemblage is shown in completely sealed and secured relationship. This is accomplished by dipping the longitudinal ends 15 and 16 of the completed assemblage of tiers and strips 17 into a tray of an appropriate liquid material whereby the nesting ends of the tiers are completely sealed together and secured to the support strip 17. The tiers and strips may be held in a jig or secured together in a temporary manner for proceeding through this dipping step. Various adhesives or thermo setting materials well known to those skilled in the art may be used for this purpose. This simplifies the otherwise individual steps necessary to accomplish the required sealing between nesting tiers and securing each apex to the support strip.

Referring more particularly to FIGURE 11, a modified support arrangement is illustrated where vertical support strips 50 extending in a direction perpendicular to the general plane of the tiers are substituted for the aforedescribed support strips 17, 37 and 38. Support strips 50 are provided with notches 51 spaced an appropriate distance for fitting the apex of each successive tier at the longitudinal ends. It is preferred that support strips 50 be provided on at least every other apex as shown in order to provide ample separating support between the tiers. The support strips 50 must be relatively stiff in the lateral direction to prevent excessive lateral flexing of the pleated tiers in an accordian fashion.

Thus it may be seen that by this invention there is provided a unique high density filter in which the filter media is self-supporting thereby eliminating the need for supporting superstructures and support elements in substantial contact with the filtering media. While I have described my invention in connection with certain embodiments it is to be understood that I do not intend to be limited to the details herein described or shown in the drawings but rather my invention is of the full scope of the appended claims.

I claim:

1. A flow-through type high density air filter, comprising, a housing having inlet and outlet openings at opposite ends longitudinally spaced a substantial distance, a plurality of filtering tiers mounted in and extending laterally across the housing, each tier comprised of a pleated filter media sheet with the pleats extending longitudinally the full distance between said housing openings and having longitudinal ends at the respective openings, said plurality of tiers oriented with the pleats aligned from tier to tier, said plurality of tiers positioned in zig-zag stacked relationship in the housing to form longitudinally converging and diverging passageways between tiers, each pair of adjacent tiers having their one longitudinal ends in nesting abutment and their other longitudinal ends spaced from each other, each tier having two sides and having a first longitudinal end in nesting abutment with the tier adjacent to one side thereof and a second longitudinal end in nesting abutment with the tier adjacent to the other side thereof, each of said longitudinal ends in nesting abutment being joined in sealed relationship, and rigid means connected to said longitudinal ends of said tiers for supporting the said spaced longitudinal ends in spaced relationship to permit the free passage of air from the housing inlet opening into the converging passageways and out through the diverging passageways and housing outlet opening.

2. The filter of claim 1 in which said rigid means comprise a laterally extending stiff strip positioned between each of the spaced longitudinal ends of the adjacent tiers and secured thereto.

3. The filter of claim 2 in which said longitudinal ends and said rigid means are coated with an adhering material for causing said sealed relationship and securing said rigid means to said tiers.

4. The filter of claim 1 in which said rigid means comprise a plurality of stiff ribs extending across the longitudinal ends of said tiers from tier to tier with said ribs secured to said longitudinal ends.

5. The filter of claim 1 in which at least two adjacent tiers are comprised of an integral sheet of filter media folded along a lateral line to form one longitudinal end of those two tiers and the said nesting abutment therebetween, said sealed relationship at that nesting abutment between those two tiers being established by such integral construction.

6. The filter of claim 1 in which said housing has flange portions on at least one of the said openings covering and sealed to the outer periphery of said plurality of tiers for preventing by-pass air flow between the tier pleats and the housing.

7. The filter of claim 1 in which the pleats are of uniform shape having straight sides and relatively sharp apexes and the angle between said sides is approximately 60°.

8. The filter of claim 1 in which said pleats are more than five times greater in longitudinal length than in pleat depth.

References Cited
UNITED STATES PATENTS

| | | | |
|---|---|---|---|
| 1,049,789 | 1/1913 | Williamson | 55—484 |
| 1,883,715 | 10/1932 | Greene | 55—487 |
| 3,099,547 | 7/1963 | Hagendoorn | 55—497 |
| 3,173,777 | 3/1965 | Tammy | 55—484 |
| 3,190,058 | 6/1965 | Farr et al. | 55—498 |

FOREIGN PATENTS

| | | |
|---|---|---|
| 1,275,496 | 10/1961 | France. |
| 1,281,293 | 12/1961 | France. |
| 1,288,229 | 2/1962 | France. |
| 540,215 | 10/1941 | Great Britain. |

HARRY B. THORNTON, *Primary Examiner.*

B. NOZICK, *Assistant Examiner.*